US012728635B2

(12) United States Patent
Yoshikawa

(10) Patent No.: US 12,728,635 B2
(45) Date of Patent: Sep. 8, 2026

(54) PRINTING DEVICE AND PRINTING METHOD

(71) Applicant: SEIKO EPSON CORPORATION, Tokyo (JP)

(72) Inventor: Eishin Yoshikawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 18/602,097

(22) Filed: Mar. 12, 2024

(65) Prior Publication Data

US 2024/0308207 A1 Sep. 19, 2024

(30) Foreign Application Priority Data

Mar. 14, 2023 (JP) ................................ 2023-039861

(51) Int. Cl.
*B41J 2/045* (2006.01)
*G06K 15/02* (2006.01)

(52) U.S. Cl.
CPC ....... *B41J 2/04551* (2013.01); *B41J 2/04586* (2013.01); *B41J 2/04593* (2013.01); *G06K 15/1848* (2013.01); *G06K 2215/101* (2013.01)

(58) Field of Classification Search
CPC ........ B41J 2/01; B41J 2/2054; B41J 2/04551; B41J 2/04586; B41J 2/04593; B41J 3/4073; B41J 3/407; B41J 11/008; B41J 29/393; B41M 5/0047
See application file for complete search history.

(56) References Cited

U.S. PATENT DOCUMENTS 11,517,093 B2 * 12/2022 Yamasaki .............. B41J 3/4073
2016/0270504 A1 * 9/2016 Miyamoto .............. B41J 3/407

FOREIGN PATENT DOCUMENTS

JP 2021-084278 A 6/2021

* cited by examiner

*Primary Examiner* — Douglas X Rodriguez
(74) *Attorney, Agent, or Firm* — Spencer Fane LLP

(57) ABSTRACT

A printing device can produce a bendable printed matter. The printing device acquires bending information including information of a bending region that is a region to be bent in a medium and information of the direction of the bending, and execute a first print mode in which printing is performed based on the bending information and a second print mode in which printing is performed differently from the first print mode. In a case of printing, in a printing region including the bending region of the medium, an image at least partially continuous in the direction of the bending, the coverage by dots of a liquid discharged to the bending region when printing the image in the first print mode is made lower than the coverage by dots of the liquid discharged to the bending region when printing the image in the second print mode.

7 Claims, 7 Drawing Sheets

PRINTING DEVICE AND PRINTING METHOD

The present application is based on, and claims priority from JP Application Serial Number 2023-039861, filed Mar. 14, 2023, the disclosure of which is hereby incorporated by reference herein in its entirety.

BACKGROUND

1. Technical Field

The present disclosure relates to a printing device and a printing method for producing a bendable printed matter.

2. Related Art

The printing device can produce a printed matter by discharging a liquid onto a medium that is intended to be bent after printing.

In addition, in order to address problems such as inability to bend a printed matter, cracking of a cured layer, and peeling of a layer from a substrate, there is disclosed a method of bending a printed matter in which, after liquid droplets discharged onto a substrate are cured, the cured liquid droplets are immersed in a predetermined liquid to reduce the rigidity of the printed matter (see JP-A-2021-84278).

However, according to JP-A-2021-84278, the step of immersing the printed matter in the predetermined liquid imposes a burden on the user. In addition, in order to improve the resistance to bending of the printed matter, it is necessary to optimize the compatibility between the ink used for image formation and the immersion liquid, and the difficulty level of designing is high.

With respect to a printed matter produced by discharging a liquid onto a flexible medium, there is a demand for improvement in a technique for improving resistance to bending of a liquid layer fixed to the medium to suppress cracking and peeling.

SUMMARY

A printing device configured to produce a bendable printed matter includes a printing head configured to discharge a liquid to a medium having flexibility and a control unit configured to control liquid discharge by the printing head, in which the control unit acquires bending information including information of a bending region, the bending region being a region to be bent in the medium, and information of a direction of the bending, the control unit is configured to execute a first print mode in which printing is performed based on the bending information and a second print mode in which printing is performed differently from the first print mode, and in a case of printing, in a printing region including the bending region of the medium, an image at least partially continuous in the direction of the bending, the control unit makes coverage by a dot of the liquid discharged by the printing head to the bending region when printing the image in the first print mode lower than coverage by a dot of the liquid discharged by the printing head to the bending region when printing the image in the second print mode.

A printing method is executed by a printing device configured to discharge a liquid to a medium having flexibility by a printing head to produce a bendable printed matter, the printing device being configured to perform a first print mode in which printing is performed based on bending information including information of a bending region, the bending region being a region to be bent in the medium, and information of a direction of the bending and a second print mode in which printing is performed differently from the first print mode, the printing method including an acquiring step of acquiring the bending information, and a printing step of printing, in a printing region including the bending region of the medium, an image at least partially continuous in the direction of the bending, in which in the printing step, coverage by a dot of the liquid discharged by the printing head to the bending region when printing the image in the first print mode is made lower than coverage by a dot of the liquid discharged by the printing head to the bending region when printing the image in the second print mode.

DESCRIPTION OF EMBODIMENTS

Embodiments of the present disclosure will be described below with reference to the drawings. Note that each diagram is merely illustrative for describing the embodiment. Since the drawings are illustrative, proportions, shapes, and shading may not be precise, consistent, or may be partially omitted.

1. General Description of Device Configuration

Figure 1:
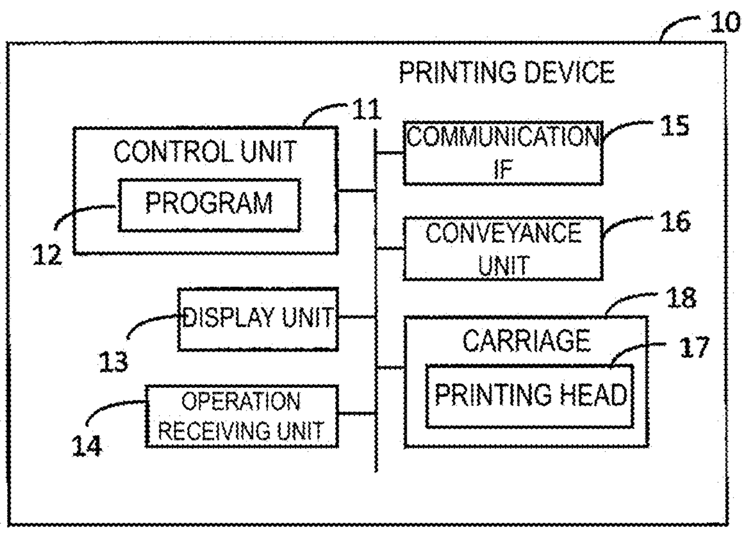
FIG. 1 is a diagram simply illustrating a device configuration.

FIG. 1 simply illustrates a configuration of a printing device 10 according to the embodiment. The printing device 10 is an inkjet printer, and mainly performs a printing method. The printing device 10 includes a control unit 11, a display unit 13, an operation receiving unit 14, a communication IF 15, a conveyance unit 16, a printing head 17, and others. IF is an abbreviation for interface.

The control unit 11 includes a CPU as a processor, a memory, and others. The control unit 11 controls the printing device 10 by the processor executing arithmetic processing according to a program 12 stored in the memory. The processor is not limited to a single CPU, and a plurality of CPUs or a hardware circuit such as an ASIC may perform processing, or a CPU and a hardware circuit may perform processing in cooperation.

The display unit 13 is a unit that displays visual information and is configured by a liquid crystal display, an organic EL display, or the like, for example. The display unit 13 may include a display and a drive circuit for driving the display.

The operation receiving unit 14 is a unit that receives an input by a user, and is implemented by a physical button, a touch panel, a mouse, a keyboard, or the like, for example. Of course, the touch panel may be implemented as one function of the display unit 13. The display unit 13 and the operation receiving unit 14 may be collectively referred to as an operation panel of the printing device 10.

The communication IF 15 is a generic term for one or a plurality of IFs for establishing communication between the printing device 10 and an external device not illustrated in a wired or wireless manner, in accordance with a prescribed communication protocol including a known communication standard. The external device is a communication device such as a personal computer, a server, a smartphone, or a tablet terminal, for example. The communication IF 15 receives a print instruction from the external device, for example.

The conveyance unit 16 is a unit that conveys a medium along a predetermined conveyance direction under the control of the control unit 11. The conveyance unit 16 includes a roller that rotates to convey the medium, a motor as a power source for rotation, and the like, for example. The medium may be any medium on which printing can be performed by a liquid, and various materials such as paper, film, plastic, and metal may be used for the medium. The printing device 10 can perform printing on both a medium having flexibility and a medium without flexibility. However, in the embodiment, it is assumed that printing is performed on a medium having flexibility. The term flexibility means a property of being pliable and bendable. The conveyance unit 16 may be a unit that conveys the medium by a belt or a pallet.

The printing head 17 is mounted on the carriage 18. As is known, the carriage 18 is a device that can reciprocate along a main scanning direction that intersects the conveyance direction of the conveyance unit 16. Accordingly, the printing head 17 moves with the carriage 18. The printing head 17 is a unit that receives liquid supply from a liquid supply unit such as an ink cartridge (not illustrated) and discharges liquid dots onto a medium by an inkjet method under the control of the control unit 11 to perform printing. The liquid is mainly ink, but the printing head 17 can also discharge various liquids other than ink, for example, a liquid for coating. The ink may be UV-curable ink which is cured by being irradiated with ultraviolet rays. Of course, the ink may be general ink which is fixed to the medium through drying. The ink is ink of a plurality of colors such as cyan (C), magenta (M), yellow (Y), and black (K), for example.

As is known, the printing head 17 includes a plurality of nozzles for discharging a liquid. The control unit 11 generates print data, and controls application of an electric signal for driving each nozzle to the drive element of each nozzle, based on the print data, thereby causing or not causing the dots to be discharged from each nozzle. An operation of discharging a liquid by the printing head 17 in accordance with the movement of the carriage 18 along the main scanning direction will be referred to as main scanning or pass. The control unit 11 performs printing on the medium by alternately repeating the main scanning and sub-scanning which is conveyance of the medium by a predetermined distance by the conveyance unit 16.

However, the printing device 10 may be a product of a type in which the carriage 18 is not included. That is, the printing head 17 may be fixed on the conveyance path of the medium, and may be configured to perform printing by discharging a liquid onto the medium being conveyed.

Alternatively, the printing head 17 may be mounted on the carriage 18, and the carriage 18 may be movable not only in the main scanning direction but also in the sub-scanning direction. That is, the printing head 17 may be configured to perform printing by making two-dimensional movement with respect to a stationary medium.

2. Printing Method

Figure 2:
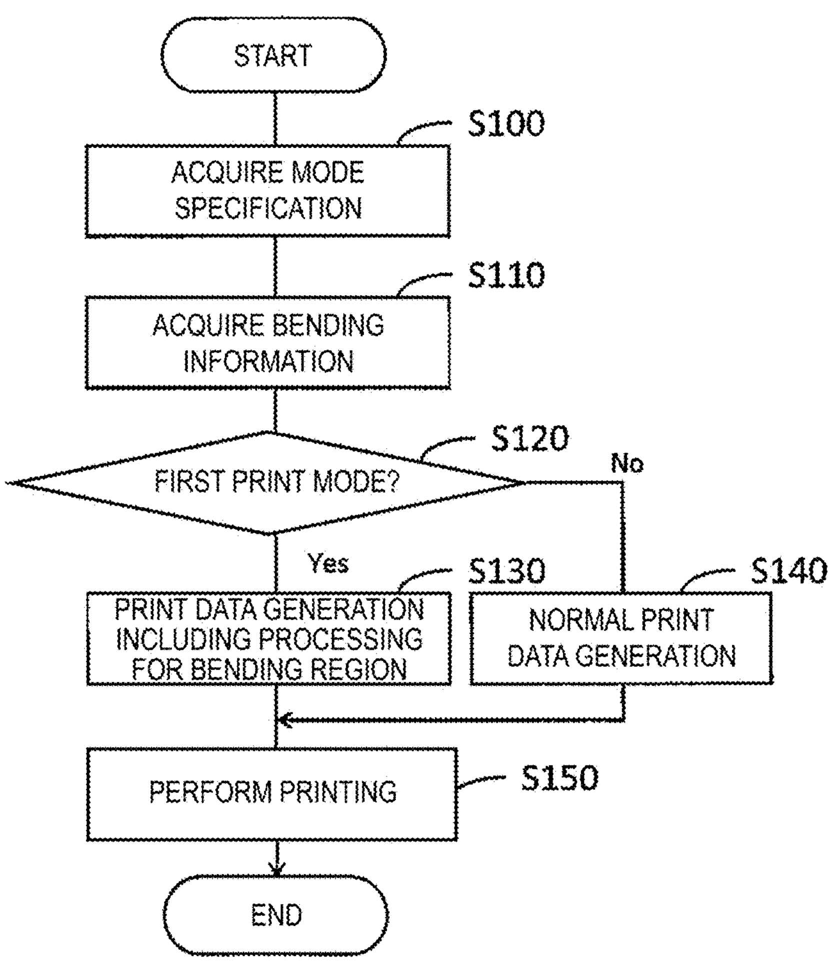
FIG. 2 is a flowchart illustrating a printing method of an embodiment.

FIG. 2 is a flowchart illustrating a printing method executed by the control unit 11 according to the program 12.

In step S100, the control unit 11 acquires a specification of the print mode. The printing device 10 can execute printing in a print mode specified from among a plurality of print modes. In the embodiment, there are assumed a "first print mode" in which printing is performed based on "bending information" and a "second print mode" in which printing is performed differently from the first print mode. The second print mode may be understood as a general term of print modes other than the first print mode.

The user can specify the print mode to the control unit 11 by operating the operation receiving unit 14. Alternatively, the control unit 11 may receive a print instruction from an external device operated by the user via the communication IF 15, and the print instruction may include a specification of the print mode. In any case, the control unit 11 acquires a specification of the print mode from the outside.

In step S110, the control unit 11 acquires the bending information. The bending information includes at least information of a bending region which is a region to be bent in the medium and information of a direction of bending (hereinafter referred to as a bending direction). Step S110 corresponds to an "acquiring step" of acquiring the bending information.

Figure 3:
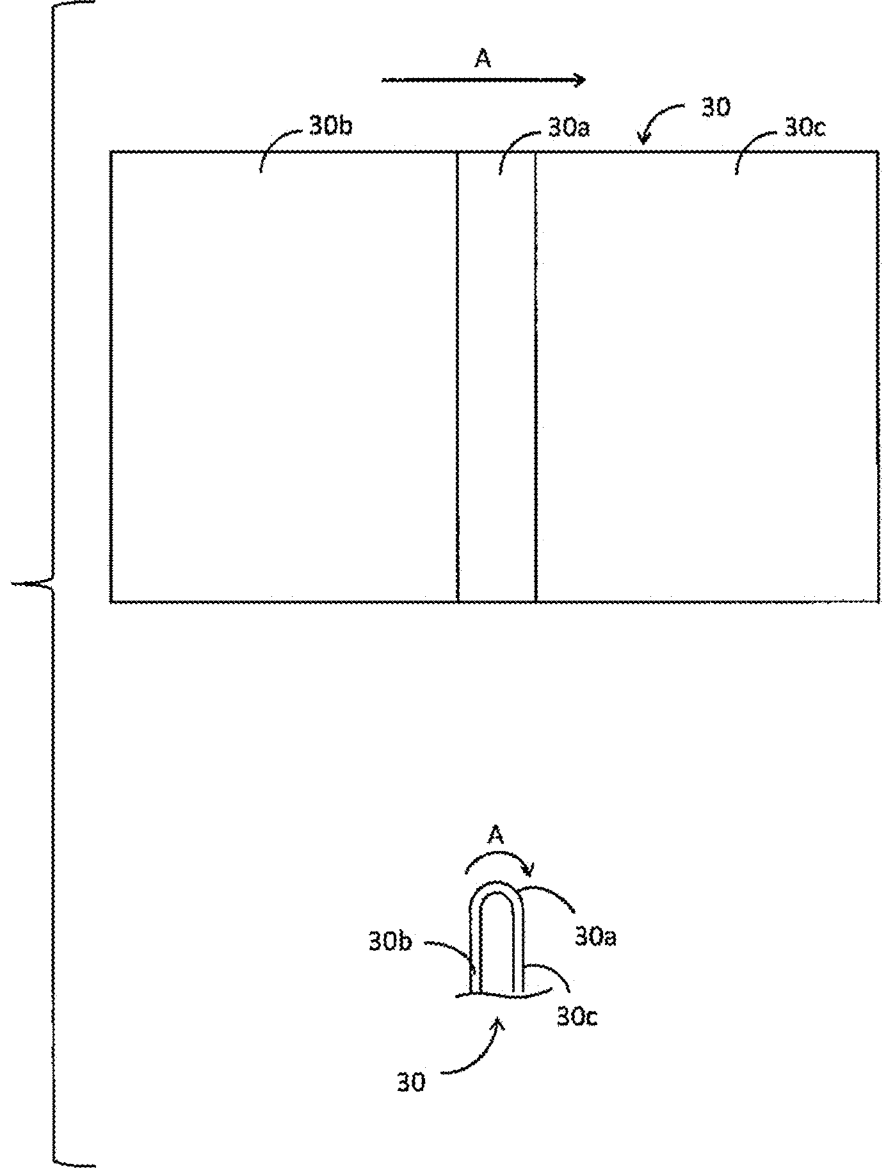
FIG. 3 is a diagram for describing a medium and bending information of the medium.

FIG. 3 illustrates an example for describing bending information of the medium 30. The medium 30 is a base material that is intended to be bent after printing in step S150 is finished, and is a cover to be attached to a smartphone, for example. Needless to say, the medium 30 may have a more complicated shape or a three-dimensional object, but FIG. 3 illustrates the medium 30 in a simplified manner. FIG. 3 also illustrates a part of the medium 30 in a bent state on the lower part, for reference.

According to FIG. 3, a central region of the medium 30 having a predetermined width in the longitudinal direction before bending is a bending region 30*a*. The bending region 30*a* has a width slightly larger than the thickness of a smartphone, and couples a cover portion 30*b* for covering the front surface of the smartphone and a cover portion 30*c* for covering the back surface of the smartphone. The bending information defines the position and size of the bending region 30*a* within the size of the medium 30. The bending information also defines a direction in which the medium 30 is bent after printing, that is, a bending direction. In the example of FIG. 3, the bending direction A is indicated by an arrow.

Similarly to the print mode specification, the user may operate the operation receiving unit 14 to input the bending information, or the bending information may be included in the print instruction from the external device operated by the user. When performing printing not requiring bending information, since no bending information is input from the outside, the control unit 11 may not necessarily acquire the bending information. However, in the following description, it is assumed that the control unit 11 has acquired the bending information. The order of steps S100 and S110 is not necessarily the order illustrated in FIG. 2, and may be reversed, or steps S100 and S110 may be performed at substantially the same time.

When using a base material intended to be bent after printing as a medium, such as the medium 30, and printing an image on a region including at least the bending region 30*a*, the user may designate the first print mode and input the bending information. On the other hand, the user may designate the second print mode when printing an image on a medium such as a general sheet that is not intended to be bent after printing, or when printing an image only on a region other than the bending region 30*a* even in a base material that is intended to be bent after printing such as the medium 30.

In step S120, the control unit 11 branches the processing depending on whether the print mode according to the specification acquired in step S100 is the first print mode or the second print mode. When the first print mode is specified, the control unit 11 proceeds from the determination of "Yes" to step S130. When a print mode other than the first print mode, that is, the second print mode is specified, the control unit 11 proceeds from the determination of "No" to step S140.

In step S140, the control unit 11 executes normal print data generation. Step S140 is general processing, and thus will be briefly described. The control unit 11 generates print data to be provided to the printing head 17 from image data representing an image to be printed on the medium. The image data is image data selected by the user through the operation of the operation receiving unit 14. Alternatively, the image data is included in a print instruction from an external device. The control unit 11 performs various types of image processing such as resolution conversion processing, color conversion processing, and gradation conversion processing on the image data to generate print data. The gradation conversion processing is also referred to as halftone processing. The print data is binary data in which dot-on or dot-off is defined for each pixel and each liquid type. The liquid type may be referred to as an ink color. The term dot-on means dot discharging, and the term dot-off means non-dot discharging. Needless to say, the print data may not be merely binary data of dot-on and dot-off for each pixel and each liquid type, but may be quaternary data or the like that defines dot-on or dot-off of any dot of a plurality of sizes that can be discharged by the nozzle, such as a large dot, a middle dot, and a small dot, for example.

In step S130, the control unit 11 executes print data generation accompanied by processing for the bending region. The step of generating the print data is basically as described in relation to step S140. The "processing for the bending region" is processing for making the coverage by the liquid dots discharged by the printing head 17 to the bending region of the medium when printing the image in the first print mode lower than the coverage by the liquid dots discharged by the printing head 17 to the bending region when printing the same image in the second print mode. Such processing is executed in step S130, and is not executed in step S140. Also in step S130, it may be understood that normal print data generation is performed for print data for printing in a region other than the bending region of the medium in the print data. The phrase "when printing the same image in the second print mode" does not mean that the same image is actually printed in the first print mode and the second print mode, but is an expression used as a comparison for explaining step S130 which is a feature of the first print mode.

A specific example of processing for the bending region in step S130 will be described.

The control unit 11 performs processing for forming, in the bending region, a "slit" in which a dot-off region in which no dots are printed is continuous in an intersecting direction intersecting the bending direction. The intersecting direction may be basically understood as a direction orthogonal to the bending direction. However, the intersecting direction does not have to be strictly orthogonal, and may obliquely intersect with the bending direction.

Figure 4:
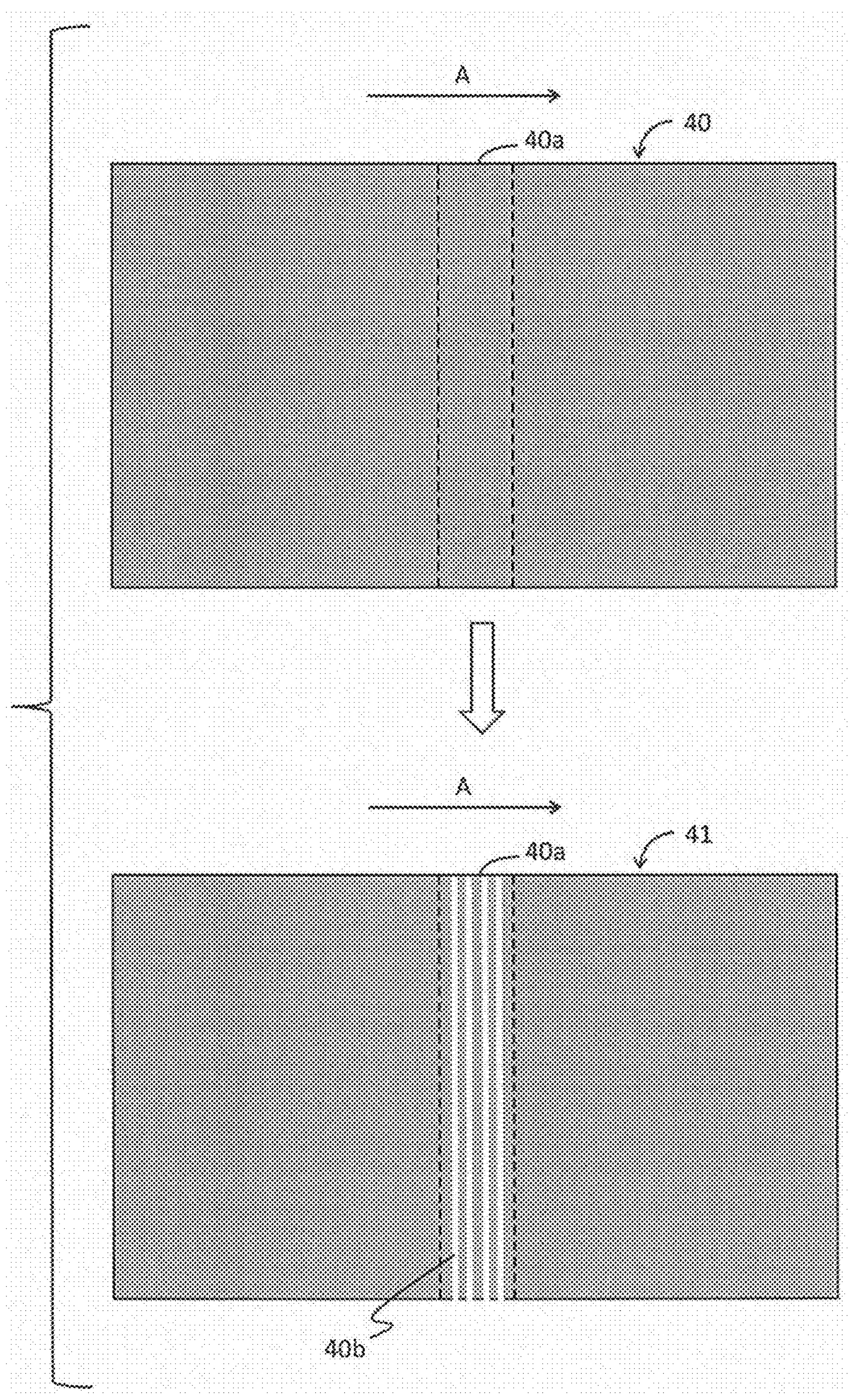
FIG. 4 is a diagram illustrating an example of image data and print data generated in step S130.

FIG. 4 illustrates a state in which slit-including print data 41 is generated from image data 40 representing the image to be printed. In FIG. 4, the image is illustrated as a gray solid image without details, but the image data 40 represents some kind of image. A region 40*a* surrounded by a broken line in the image data 40 is an image region corresponding to the bending region 30*a* in the medium 30. The region 40*a* will be referred to as a bending image region 40*a*. The position, size, and bending direction A of the bending image region 40*a* in the image data 40 can be specified from the above-described bending information. The bending image region 40*a* is a region in common between the image data 40 and the print data 41. The control unit 11 generates the print data 41 including the slits 40*b* in the bending image region 40*a*.

In the example of FIG. 4, since the bending direction A is oriented in the lateral direction, the plurality of slits 40*b* are oriented in the longitudinal direction. The slits 40*b* are continuous dot-off lines in the data. In the step of generating the print data, the timing of forming the slits 40*b* varies. For example, the control unit 11 forms the slits 40*b* in which the dots are eliminated from the bending image region 40*a* in the print data 41 that has been generated once in the step of generating normal print data, thereby to complete the print data 41.

In step S150, the control unit 11 provides the print data generated in step S130 or step S140 to the printing head 17, controls the printing head 17, the conveyance unit 16, and the carriage 18 as necessary, and executes printing on the medium based on the print data. Needless to say, step S150 executed through step S130 is printing in the first print mode, and step S150 executed through step S140 is printing in the second print mode.

According to the printing based on the print data 41 with the slits 40*b* formed in the bending image region 40*a* as described above, the coverage of the dots in the bending region of the medium is lowered by the presence of the slits 40*b* as compared with the printing based on the print data by normal print data generation in which the slits 40*b* are not formed. In other words, in the first print mode, forming the slits 40*b* reduces the discharge amount of the liquid to the bending region of the medium as compared with the case where the liquid is discharged to the bending region of the medium in the second print mode.

Figure 5:
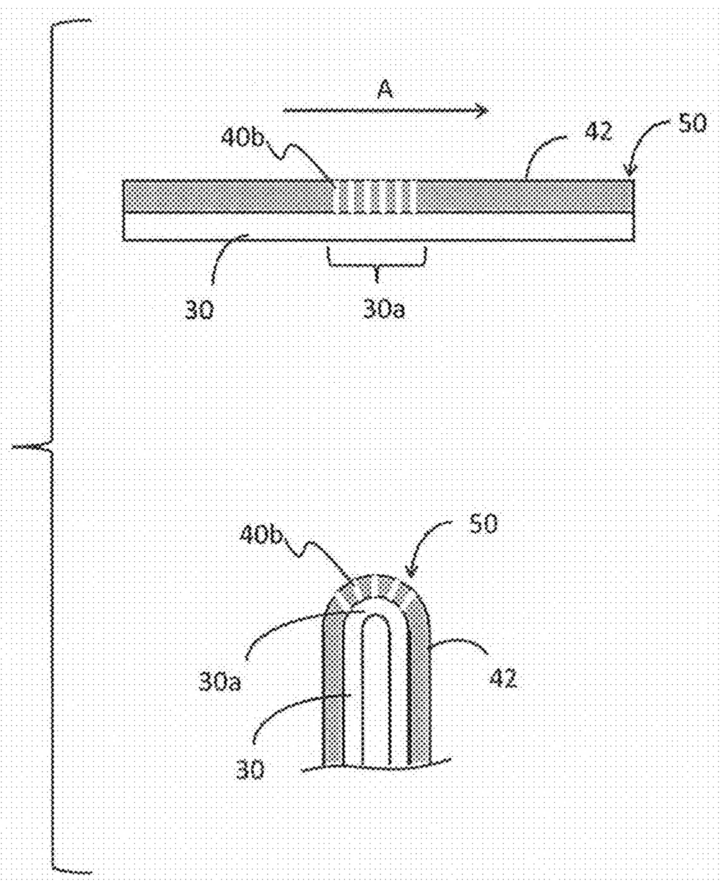
FIG. 5 is a simplified cross-sectional view of a part of a printed matter obtained in a first print mode.

FIG. 5 is a cross-sectional view of a part of printed matter 50 obtained as a result of the first print mode, the part including the bending region 30*a* of the medium 30. On the medium 30, a liquid layer that is a print result of the image based on the print data 41, that is, an ink layer 42, is formed. The slits 40*b* are formed at the ink layer 42 in a range corresponding to the bending region 30*a*. FIGS. 4 and 5 illustrate both the slits as data and the slits actually formed in the bending region 30*a* with the same reference numeral 40*b*. As illustrated in the lower part of FIG. 5, when the printed matter 50 is bent in the bending region 30*a*, the force applied to the ink layer 42 is distributed due to the presence of the slits 40*b*, so that the film of the ink layer 42 is avoided from being irregularly cracked or peeled off, and the quality of the printed matter 50 is maintained. In the embodiment, the difficulty of impairing the quality of the printed matter when being bent will be referred to as resistance to bending. According to the first print mode, the resistance of the ink layer 42 to the bending in the bending region 30*a* is improved. If the ink is UV-curable ink, the printed matter 50 is bent after the ink layer 42 is cured by irradiation with ultraviolet rays. The thickness of the slits 40*b*, that is, the width of the slits 40*b* does not need to be thick enough to be visually recognized by the user.

Figure 6A:
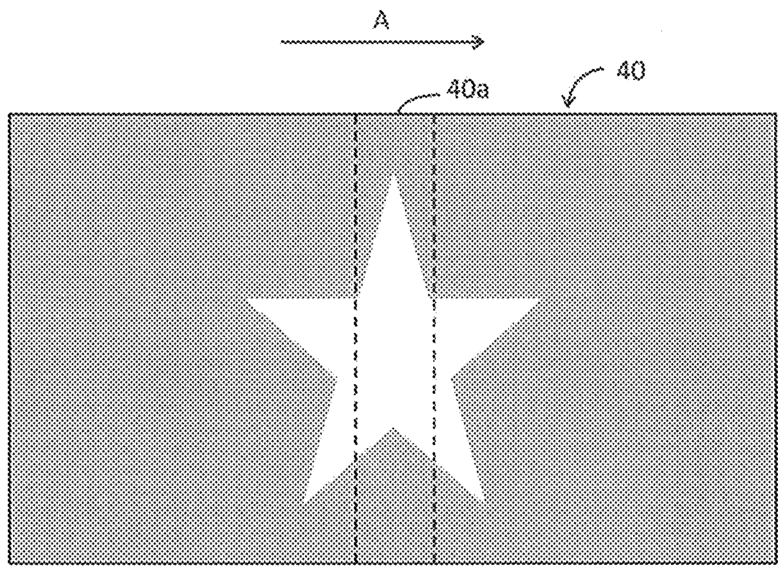
FIGS. 6A and 6B are diagrams illustrating examples of image data, which are different from that in FIG. 4.
Figure 6B:
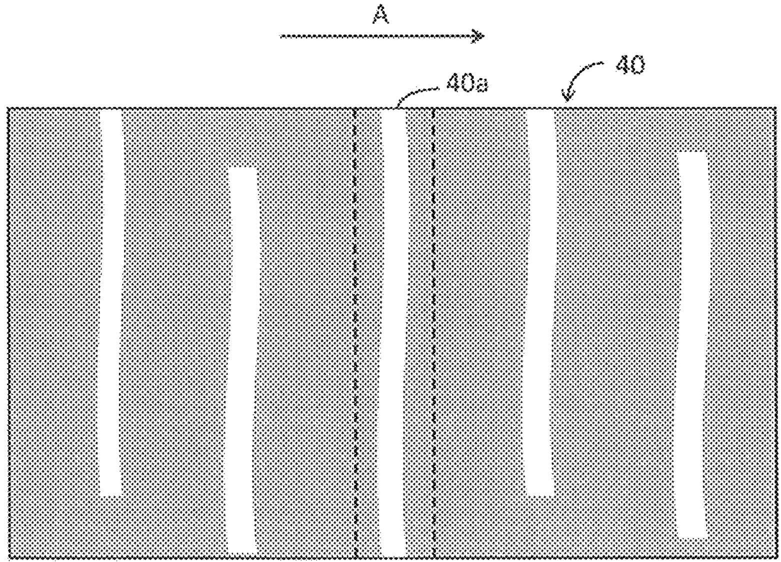

FIGS. 6A and 6B illustrate examples of the image data 40 representing images to be printed, which are different from the image data 40 in FIG. 4. The image data 40 is viewed in common among FIGS. 4, 6A, and 6B. The user designates the first print mode when causing the printing device 10 to print, in the printing region including the bending region of the medium, an image at least partially continuous in the bending direction. The printing region including the bending region means a region including at least the bending region in the medium, and the printing region may be only the bending region.

The image represented by the image data 40 illustrated in FIG. 6A has a star-shaped blank in a region including the bending image region 40*a*, but the image is continuous in the bending direction A in a place other than the blank in the bending image region 40*a*. Therefore, the image data 40 illustrated in FIGS. 4 and 6A is image data for printing, in the printing region including the bending region of the medium, an image at least partially continuous in the bending direction. When causing the printing device 10 to execute printing based on the image data 40 according to the example of FIG. 4 or 6A, the user may specify the first print mode.

On the other hand, according to the image data 40 illustrated in FIG. 6B, the image is completely interrupted by a blank in the bending direction A in the bending image region 40*a*. Therefore, the image data 40 illustrated in FIG. 6B is not image data for printing, in the printing region including the bending region of the medium, an image at least partially continuous in the bending direction, and the user may designate the second print mode when performing printing based on the image data 40 according to the example of FIG. 6B. In other words, as illustrated in FIG. 6B, when the image is interrupted in the bending direction A in the bending image region 40*a*, it is the same as when the image originally has slits, and thus it is less necessary to select the first print mode.

There is a possibility that the user may also designate the first print mode when causing the printing device 10 to execute printing based on the image data 40 as illustrated in FIG. 6B. In this case, however, the execution of the first print mode means little. Therefore, when printing, in the printing region including the bending region of the medium, an image at least partially continuous in the bending direction, the effect of the first print mode is particularly exhibited, and this can be said to be one of the features of the embodiment.

The slits 40*b* may be formed such that the dot-off region is continuous in the direction intersecting the bending direction in the bending region of the medium, and may not be linear unlike those illustrated in FIG. 4. The slits 40*b* may be curved lines or zigzag lines, for example. The slits 40*b* may represent a pattern or texture by a plurality of lines crossed or coupled.

Figure 7:
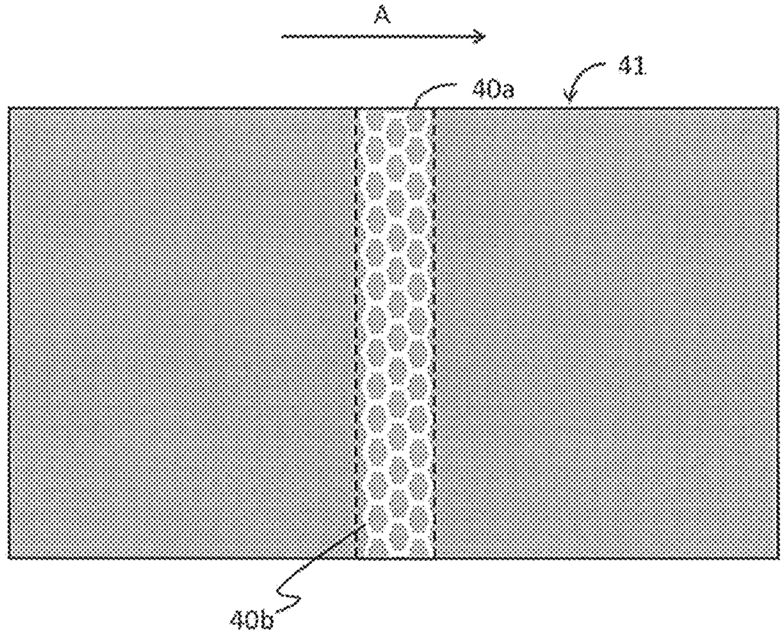
FIG. 7 is a diagram illustrating an example of print data generated in step S130, which is different from that in FIG. 4.

FIG. 7 illustrates an example of the print data 41 generated by the control unit 11 in step S130, which is different from the print data 41 of FIG. 4. In the example of FIG. 7, in the bending image region 40*a* of the print data 41, a mesh texture in which a plurality of continuous dot-off lines regularly crosses are formed as the slits 40*b*.

The control unit 11 may receive the selection of the shape of the slits 40*b* and form the slits 40*b* having the shape selected in the bending region. Specifically, the user freely selects the shape of the slits 40*b* from a plurality of options of the shape of the slits 40*b* through a UI screen displayed on the display unit 13 or the display of an external device. UI is an abbreviation for user interface. The options of the shape of the slits 40*b* are options of various shapes such as a curve, a zigzag shape, and other patterns as described above in addition to the straight line and the texture illustrated in FIGS. 4 and 7.

The control unit 11 receives the selection of the shape of the slits 40*b* through the operation receiving unit 14, the display unit 13, or the communication IF 15 at timing earlier than the determination in step S120. Selection of the shape of the slits 40*b* may be included in the print instruction received from an external device through the communication IF 15. Then, in step S130, the control unit 11 may form the slits 40*b* having the shape according to the selection received as described above in the bending image region 40*a* when generating the print data with the processing for the bending region.

3. Processing According to Bending Rate

The bending information acquired by the control unit 11 in step S110 may include information of a bending rate at which the bending region of the medium is bent. The bending rate is the depth of the bending angle. In the examples of FIGS. 3 and 5, the bending rate of the medium 30 is 180 degrees, because the medium 30 is a base body in which the bending region 30*a* is intended to be bent by 180 degrees after printing so that the cover portion 30*b* and the cover portion 30*c* face each other. Depending on the characteristics of the medium and the intended use after printing, the bending rate varies, such as 30 degrees, 45 degrees, 60 degrees, 90 degrees, and so forth. Therefore, the bending information input from the outside includes the bending rate in addition to the information of the bending region and the bending direction.

Assuming that when the bending rate is a first bending rate, the coverage in the first print mode is defined as a first coverage, and that when the bending rate is a second bending rate larger than the first bending rate, the coverage in the first print mode is defined as a second coverage, the control unit 11 may control the first coverage to be higher than the second coverage. That is, as the medium has the bending region bent more deeply after printing, the control unit 11 decreases the discharge amount of liquid to the bending region in steps S130 and S150.

Specifically, the control unit 11 changes the width of the slits 40*b* in accordance with the bending rate. As a specific example, it is assumed that the first bending rate is 90 degrees and the second bending rate is 180 degrees. In the processing executed in step S130 when the bending rate included in the bending information indicates 90 degrees, the control unit 11 sets the width of each slit 40*b* in the bending image region 40*a* to m pixels to generate the print data 41. In the processing executed in step S130 when the bending rate indicates 180 degrees, the control unit 11 sets the width of each slit 40*b* to m×2 pixels, for example, to generate the print data 41. In this manner, as the bending rate is increased, the width of the slits 40*b* is increased to decrease the dot coverage in the bending region.

Alternatively, the control unit 11 may change the number of the slits 40*b* in accordance with the bending rate. Here, the above-described specific example will also be adopted. In the processing executed in step S130 when the bending rate included in the bending information indicates 90 degrees, the control unit 11 sets the number of the slits 40*b* in the bending image region 40*a* to n to generate the print data 41. In the processing executed in step S130 when the bending rate indicates 180 degrees, the control unit 11 sets the number of the slits 40*b* to n×2, for example, to generate the print data 41. In this manner, as the bending rate is increased, the number of the slits 40*b* is increased to decrease the dot coverage in the bending region. m and n are predetermined natural numbers. The control unit 11 may change the width and number of the slits 40*b* in accordance with the bending rate.

4. Modification Regarding Step S130

The processing of the print data executed by the control unit 11 in step S130 is not limited to the processing of forming the slits 40*b* in the bending region of the medium. When generating the print data corresponding to the bending region in the print data, the control unit 11 may vary at least a part of a mask and a table used for the image processing for generating the print data in the first print mode from a mask and a table used in the second print mode. Changing the mask and table used for image processing in this manner is also regarded as a kind of processing for the bending region. According to the above description, the print data corresponding to the bending region in the print data refers to data of the bending image region 40*a* in the print data 41.

The masks and tables used for the image processing are tables and masks used for the above-described color conversion processing and halftone processing. A plurality of masks and tables are stored in advance in the printing device 10, or a plurality of masks and tables are stored in an external storage device that can be referred to by the printing device 10. For example, a color conversion LUT used for color conversion of the gradation value of the color of each pixel of the image data into the CMYK gradation value in the color space of the print data corresponds to the above-described table. The LUT is an abbreviation for a lookup table. The gradation value is expressed by 256 gradations of 0 to 255, for example. The CMYK gradation values represent the amounts of CMYK ink. A dither mask used for the halftone processing on the CMYK gradation values of the image data corresponds to the above-described mask. A dot sorting table for converting the CMYK gradation values into values of occurrence rates of large dots, middle dots, and small dots having different sizes also corresponds to the example of the above-described table.

In step S130, when generating the print data of the bending image region 40*a*, the control unit 11 uses a color conversion LUT that outputs CMYK gradation values smaller than a color conversion LUT used in the process of generating normal print data in step S140, for example. As a result, according to the first print mode, the amount of ink discharged to the bending region of the medium is made smaller than that in the second print mode to decrease the coverage, so that the ink layer 42 can be thinned. Thinning the ink layer 42 in the bending region decreases the possibility of the ink layer 42 becoming cracked or peeled when being bent, and improves the resistance to bending.

When the dot coverage in the bending region is to be decreased, the coverage can be decreased without changing the amount of ink as compared with the amount of ink discharged to the bending region in order to print the same image in the second print mode.

In step S130, when generating the print data of the bending image region 40*a*, the control unit 11 may use a dot sorting table in which the occurrence rate of large dots is increased and the occurrence rates of small dots and middle dots are decreased as compared with the dot sorting table used in the process of generating normal print data in step S140, for example. As a result, according to the first print mode, the proportion of large dots in the plurality of dots discharged to the bending region of the medium can be made higher than that in the second print mode. Even if the same total amount of ink is discharged to the bending region, the number of dots decreases when the proportion of relatively large dots is increased. decreasing the number of dots makes a blank likely to occur in the bending region, decreases the coverage, and achieves partial thinning of the ink layer 42 and improvement in resistance to bending due to the thinning.

In step S130, when generating the print data of the bending image region 40*a*, the control unit 11 may use a dither mask having lower dot dispersibility than a dither mask used in the process of generating normal print data in step S140, for example. As known, the dither mask is a matrix in which a plurality of different threshold values for comparing with the gradation value and the occurrence rate of ink are arranged, and is applied to image data in halftone processing to determine dot-on or dot-off for each pixel and for each ink color. It can be said that the dither mask has higher dispersibility as the arrangement of the dots to be generated is closer to evenness, and conversely, has lower dispersibility as the arrangement of the dots to be generated is irregular.

When the dispersibility of the dots with the dither mask is relatively low, the dots are concentrated at a certain position or the dots are sparse at other positions, so that uneven density and imbalance of the dots occur in the region, resulting in a decrease in the coverage. As described above, in the first print mode, using the dither mask having relatively low dot dispersibility in order to generate the print data of the bending image region 40*a* decreases the coverage of the dots in the bending region, and achieves partial thinning of the ink layer 42 and improvement in resistance to bending due to the partial thinning.

Naturally, such modifications relating to step S130 may be implemented in combination. In the first print mode, the coverage of the dots in the bending region may be changed in accordance with the bending rate by changing at least a part of the mask and the table used for the image processing for generating the print data as described above, instead of changing the width or the number of the slits 40*b*.

5. Conclusion

As described above, according to the embodiment, the printing device 10 includes the printing head 17 that discharges a liquid to a medium having flexibility and the control unit 11 that controls liquid discharge by the printing head 17, and can produce a bendable printed matter. The control unit 11 acquires bending information including information of a bending region that is a region to be bent in a medium and information of a direction of bending, and can execute a first print mode in which printing is performed based on the bending information and a second print mode in which printing is performed differently from the first print mode. In a case of printing, in a printing region including the bending region of the medium, an image at least partially continuous in the direction of the bending, the control unit 11 makes the coverage by dots of a liquid discharged by the printing head 17 to the bending region when printing the image in the first print mode lower than the coverage by dots of the liquid discharged by the printing head 17 to the bending region when printing the image in the second print mode.

According to the above configuration, when printing, in the printing region including the bending region of the medium, an image at least partially continuous in the bending direction in the first print mode, the control unit 11 decreases the coverage of the bending region as compared with when printing in the second print mode, and thins the liquid layer or increases the blank in the bending region. This improves the resistance to the bending of the printing result in the bending region.

According to the embodiment, the bending information may include information of the bending rate at which the bending region is bent.

The control unit 11 may control a first coverage to be higher than a second coverage, where the first coverage is the coverage in the first print mode when the bending rate is a first bending rate, and the second coverage is the coverage in the first print mode when the bending rate is a second bending rate larger than the first bending rate.

According to the above configuration, in the first print mode, the control unit 11 can maintain the quality of the printed matter even though the medium after printing is bent at any bending rate, by decreasing the coverage of the bending region in accordance with the increase in the bending rate.

According to the embodiment, in the first print mode, the control unit 11 may form a slit in the bending region, the slit being a dot-off region that is continuous in the intersecting direction intersecting the direction of the bending and in which no dot is printed.

According to the above-described configuration, the control unit 11 can help prevent the liquid layer from being cracked or peeled in the bending region and maintain the quality of the printed matter by forming blank slits along the intersecting direction in the bending region.

According to the embodiment, the control unit 11 may change the width of the slit in accordance with the bending rate.

According to the above-described configuration, the control unit 11 can maintain the quality of the printed matter regardless of the bending rate by changing the width of the slits in accordance with the bending rate.

According to the embodiment, the control unit 11 may change the number of the slits in accordance with the bending rate.

According to the above-described configuration, the control unit 11 can maintain the quality of the printed matter regardless of the bending rate by changing the number of the slits in accordance with the bending rate.

According to the embodiment, the control unit 11 may receive the selection of the shape of the slits and form the slits having the shape selected in the bending region.

According to the above-described configuration, allowing the user to select the shape of the slits improves the resistance to the bending of the printing result in the bending region and improves the design property at the same time.

According to the embodiment, when generating the print data corresponding to the bending region of the print data to be provided to the printing head 17 for printing the image, the control unit 11 may vary at least a part of a mask and a table used in image processing for generating the print data in the first print mode from the mask and the table used in the second print mode.

According to the above-described configuration, in the first print mode, when generating the print data corresponding to the bending region, the control unit 11 can decrease the coverage of the bending region by using the mask or the table different from those in the second print mode, and can help prevent the liquid layer from being cracked or peeled off in the bending region and maintain the quality of the printed matter.

Note that, in the scope of the claims, only some of the combinations of the claims are described. However, as a matter of course, the embodiment includes not only one-to-one combinations of the independent claims and the dependent claims but also various combinations of the plurality of dependent claims.

In addition to the printing device 10, the embodiment discloses the printing method and the program 12 for executing the printing method in cooperation with a processor.

That is, in the printing method executed by the printing device 10 capable of discharging a liquid to a medium having flexibility by the printing head 17 to produce a bendable printed matter, it is possible to execute the first print mode in which printing is performed based on bending information including information of a bending region that is a region to be bent in the medium and information of a direction of bending, and the second print mode in which printing is performed differently from the first print mode. The printing method includes an acquiring step of acquiring the bending information, and a printing step of printing, in a printing region including the bending region of the medium, an image at least partially continuous in the direction of the bending. In the printing step, the coverage by dots of the liquid discharged by the printing head 17 to the bending region when printing the image in the first print mode is made lower than the coverage by dots of the liquid discharged by the printing head 17 to the bending region when printing the image in the second print mode. As understood from the above description, step S130 and subsequent step S150 correspond to the "printing step" of the method.

What is claimed is:

1. A printing device configured to produce a bendable printed matter, the printing device comprising:

a printing head configured to discharge a liquid to a medium having flexibility; and a control unit configured to control liquid discharge by the printing head, wherein the control unit acquires bending information including information of a bending region, the bending region being a region to be bent in the medium, and information of a direction of the bending, the control unit is configured to execute a first print mode in which printing is performed based on the bending information and a second print mode in which printing is performed differently from the first print mode, in a case of printing, in a printing region including the bending region of the medium, an image at least partially continuous in the direction of the bending, the control unit makes coverage by a dot of the liquid discharged by the printing head to the bending region when printing the image in the first print mode lower than coverage by a dot of the liquid discharged by the printing head to the bending region when printing the image in the second print mode, and in the first print mode, the control unit forms a slit in the bending region, the slit being a dot-off region that is continuous in an intersecting direction intersecting the direction of the bending and in which no dot is printed.

2. The printing device according to claim 1, wherein the bending information includes information of a bending rate at which the bending region is bent and the control unit controls a first coverage to be higher than a second coverage, where the first coverage is the coverage in the first print mode when the bending rate is a first bending rate, and the second coverage is the coverage in the first print mode when the bending rate is a second bending rate larger than the first bending rate.

3. The printing device according to claim 1, wherein the bending information includes information of a bending rate at which the bending region is bent and the control unit changes a width of the slit in accordance with the bending rate.

4. The printing device according to claim 1, wherein the bending information includes information of a bending rate at which the bending region is bent and the control unit changes the number of the slit in accordance with the bending rate.

5. The printing device according to claim 1, wherein the control unit receives selection of a shape of the slit, and forms the slit having the shape selected in the bending region.

6. The printing device according to claim 1, wherein when generating print data corresponding to the bending region of the print data to be provided to the printing head for printing the image, the control unit varies at least a part of a mask and a table used in image processing for generating the print data in the first print mode from the mask and the table used in the second print mode.

7. A printing method executed by a printing device configured to discharge a liquid to a medium having flexibility by a printing head to produce a bendable printed matter, the printing device being configured to perform a first print mode in which printing is performed based on bending information including information of a bending region, the bending region being a region to be bent in the medium, and information of a direction of the bending and a second print mode in which printing is performed differently from the first print mode, the printing method comprising:

acquiring the bending information; and printing, in a printing region including the bending region of the medium, an image at least partially continuous in the direction of the bending, wherein in the printing, coverage by a dot of the liquid discharged by the printing head to the bending region when printing the image in the first print mode is made lower than coverage by a dot of the liquid discharged by the printing head to the bending region when printing the image in the second print mode, and in the first print mode, a slit is formed in the bending region, the slit being a dot-off region that is continuous in an intersecting direction intersecting the direction of the bending and in which no dot is printed.

* * * * *